Patent text

3,078,310
ISOMERIZATION OF PRIMARY, SECONDARY OR TERTIARY ORGANOBORON COMPOUNDS INTO ISOMERS THEREOF
Herbert C. Brown, 1840 Garden St., West Lafayette, Ind.
No Drawing. Filed Dec. 7, 1959, Ser. No. 857,508
28 Claims. (Cl. 260—606.5)

This invention relates to organoboron compounds, particularly the conversion of secondary or tertiary organoboron compounds into primary compounds and the conversion of primary, secondary or tertiary organoboron compounds into isomers thereof.

It has been known that diborane can be reacted with olefins to produce organoboron compounds. That is, the boron hydride compound adds to the olefin. More recently this process has been improved upon by the employment of particular catalysts permitting a greater and more efficient utilization of the basic reaction. In this connection it has become possible to more efficiently produce secondary or tertiary organoboron compounds. Although such materials are useful, in some cases they are less useful than primary organoboron compounds. With the advent of an improved process for the production of organoboron compounds and the previous sources of secondary and tertiary organoboron compounds, it is desirable to convert such materials to primary organoboron compounds. Such is especially desirable in that the organoboron compounds provide a source for the production of alcohols by their oxidation and hydrolysis. In this use the straight chain or primary alcohols are of most importance in the preparation of detergents or plasticizers. Therefore, it is desirable to provide a process whereby the secondary or tertiary organoboron compounds are converted into normal or primary organoboron compounds providing this further source for use in the production of detergents and other uses known to such boron compounds.

It is also very desirable to provide processes whereby primary, secondary, or tertiary organoboron compounds are converted to isomers thereof. In particular, the conversion of primary organoboron compounds into isomeric primary organoboron compounds, of tertiary organoboron compounds into isomeric secondary organoboron compounds, and of secondary organoboron compounds into isomeric secondary organoboron compounds would be an exceedingly valuable contribution to the art. Processes to effect such conversions would enable preparation of a virtually unlimited number of various organoboron isomers from various appropriate organoboron compounds. The isomeric organoboron compounds resulting from such conversion processes would be an elegant source of a wide variety of alcohols (primary, secondary, and tertiary) many of which could only be made heretofore by exceedingly complicated, round-about, and costly methods. In effect, such conversion processes when used in conjunction with diborane-olefin addition reactions would convert rather cheap and abundant olefins into valuable, and in many cases, rare alcohols.

An object of the present invention is to provide a process for the preparation of primary organoboron compounds. More particularly, an object is to provide a novel and efficient process for the conversion of secondary or tertiary organoboron compounds into primary organoboron compounds. Another object is to provide processes for the conversion of primary, secondary, or tertiary organoboron compounds into isomers thereof. A further more particular object of this invention is to provide novel and efficient processes for the conversion of primary organoboron compounds into isomeric primary organoboron compounds, for the conversion of tertiary organoboron compounds into isomeric secondary organoboron compounds, and for the conversion of secondary organoboron compounds into isomeric secondary organoboron compounds. These and other objects will be evident as the discussion proceeds.

The above and other objects of this invention are in part achieved by heating a secondary or tertiary organoboron compound at a temperature between about 50 to 300° C. This process is particularly well suited to the conversion of secondary or tertiary alkylboron compounds into primary alkylboron compounds. In a particularly preferred embodiment, this reaction is conducted in the presence of a catalyst, especially the polyethers, among which the dimethyl, diethyl and methyl ethyl ether of diethylene glycol are particularly well suited. A specific embodiment of this process comprises the treatment of a secondary or tertiary trialkyl boron compound wherein the alkyl groups contain between about 3 to 20 carbon atoms dissolved in the dimethyl ether of diethylene glycol at a temperature between about 100 to 175° C. to produce the corresponding primary trialkylboron compounds.

By the above process of this invention, one can achieve the conversion of internal olefins into primary organoboron compounds which can be further employed to result in the ultimate realization of the more desirable straight chain or primary organo compounds, as, for example, straight chain alcohols. Thus another embodiment of this invention comprises the reaction of diborane with an internal olefin to produce the secondary organoboron compound and then heating the reaction mixture obtained further at a temperature between about 50 to 300° C. to convert the secondary organoboron compound into a straight chain or primary organoboron compound. A particularly preferred embodiment of this process comprises the reaction of diborane with an internal hydrocarbon olefin having from 4 to 20 carbon atoms in the presence of the dimethyl ether of diethylene glycol at a temperature between about 5 to 100° C. for substantial conversion to the secondary alkyl boron compound then raising the temperature of the reaction mixture to between about 100 to 175° C., thereby converting the secondary alkylboron compound to a straight chain primary alkylboron compound.

By the above process of this invention secondary and tertiary organoboron compounds are converted into a very desirable primary organoboron compound. By the employment of catalysts in these reactions further advantage is achieved in that lower reaction temperature can be employed and shorter reaction times are required with simultaneous enhancement in yield. Another advantage is that the generally less useful internal olefins can now be more widely employed to result in very desirable and useful end products. A particularly significant advantage of the above process is that the isomerization may embody not only a shift from the 2-position to the 1-position but also from the 3, 4, and like positions to the 1-position. For example, tri-3-pentyl borane is converted to tri-n-pentyl borane by the process. The efficiency and effectiveness of this conversion is particularly distinguishable when the polyether catalysts are employed. Thus, a particularly unique and preferred embodiment of the invention provided for the first time is the conversion of organoboron compounds wherein the boron is attached to a carbon atom of a chain other than the first and second carbon atoms to a boron compound which is primary. Other advantages will appear as the discussion proceeds.

The organoboron compounds employed in the above process are in general any boron compound having at least one boron to carbon bond wherein the carbon in such bonding is not a terminal carbon atom. Among such compounds are included those having the formula

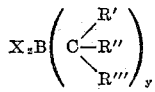

wherein R', R", and R'" can be the same or different organo radicals, preferably hydrocarbon, having up to about 30 carbon atoms, preferably at least 2 carbon atoms, R" and R'" can also be hydrogen, X can be oxygen, OR, hydrogen, or a halide, and y can be from 1 to 3 inclusive and z can be 0 to 2 inclusive. Included among such organoboron compounds are, for example, triisopropyl boron, tri-2-butyl boron, tri-2-pentyl boron, tri-3-pentyl boron, tri-2-hexyl boron, tri-3-hexyl boron, tri-sec-octyl boron, tri-4-octyl boron, tri-sec-decyl boron, tri-sec-tetradecyl boron, tri-4-octadecyl boron, tri-sec-eicosyl boron, tri(5-phenyl-3-pentyl)boron, tri(2-cyclohexyl-4-octyl)boron, tert-butyl boron diethyl, di-3-pentyl boron bromide, di-3-octylboric acid, 3-hexylboric acid, 3-pentyldiborane, tert-butyl boric oxide, 4-heptyl boric oxide, 3-pentylboranetrimethylamine, 5-decylborane-triethylamine, tri-3-pentylborane-triethylamine, 3-pentyl dimethylboronate, 3-pentyl diphenylboronate, 3-heptyl methyltolylboronate, di-2-hexyl ethylborinate, di-(3-methylbutyl) boron hydride, di-(4-methylpentyl) boron hydride, ethyl 2-methylbutyl boron hydride, and the like. It is to be understood that the aforementioned and other secondary and tertiary organoboron compounds can be further substituted provided such substitutions are inert and do not hinder the conversion to the primary organoboron compound. The fully alkylated boron compounds are especially preferred and particularly useful in the above process of this invention providing, upon treatment, three primary carbon chains attached to the boron atom. Such boron compounds in which the organo portion is hydrocarbon and alkyl having up to about 20 carbon atoms are more especially preferred in view of their greater availability and ease of conversion by this process.

The above process is generally conducted at temperatures between about 50 to 300° C. Temperatures substantially below 100° C. are generally not employed in the foregoing embodiments of this invention unless a boron hydride is used as a catalyst. But when such catalyst is used, temperatures between about 50 and about 200° C. or higher are very useful. Likewise, temperatures above 200° C. are sometimes undesirable in these embodiments in view of possible side effects such as disproportionation. A particularly preferred operating temperature range for the above process is between 100 to 175° C. Employing this range results in optimum conversion and minimization of side effects with short reaction periods. Likewise this range is particularly effective when the shift of the position of the boron in the chain is from the 3 and 4 and numerically higher positions, as distinguished from a shift from the 2-position, to the 1-position.

Excellent catalysts for promoting conversion of secondary and tertiary organoboron compounds into primary organoboron compounds are the hydrides of boron. In other words, the foregoing conversions are rendered even more specific by conducting the above processes in admixture with a catalytic quantity of a compound possessing at least one boron to hydrogen bond. Such catalysts can be present in very small amounts. Even traces greatly assist in effecting more selective isomerization. Generally speaking, amounts of catalyst ranging from traces to about 67% of the organoboron compound being isomerized are very satisfactory.

The foregoing catalysts comprise organoboron hydrides and diborane itself. Illustrative of the organoboron hydrides are compositions of the types $(RBH_2)_2$ and $(R_2BH)_2$ where R is the alkyl group being isomerized. These are the types of compounds which may be formed by addition of excess diborone to the system in relative amounts indicated by the equations:

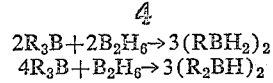

In addition, preformed organoboron hydrides can be added as catalysts. Illustrative of this type of catalyst are tetramethyldiborane, dimethyldiborane, tetraethyldiborane, dimethyldiborane, tetraphenyldiborane, diphenyldiborone, dicyclohexyldiborane, tetracyclohexyldiborane, di-2-butyldiborane, tetra-2-butyldiborane, etc.

One very excellent way of providing a catalytic quantity of a boron hydride catalyst is to form the organoboron compound to be converted by reacting an appropriate internal olefin with a quantity of diborane somewhat in excess of that required to hydroborate the olefin. In this way, the secondary or tertiary organoboron compound is formed in admixture with the excess diborane. This excess is then available to exert its beneficial catalytic activity upon the heating of this organoboron compound to form the primary organoboron compound, perhaps by interaction with the trialkylboron compounds as indicated above.

A very significant facet of the present invention is the discovery that certain organoboron compounds can be isomerized in such a way that the boron atom will be moved down a carbon chain past one or more carbon atoms which each contain one hydrogen atom and one hydrocarbon radical. Some of the ramifications of this unprecedented discovery are that:

(1) The boron will traverse a branching in a carbon chain. Such a traversal can be illustrated as follows:

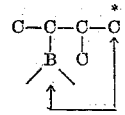

In effect, the boron atom is repositioned from the locus shown to the carbon atom denoted by an asterisk.

(2) The boron will traverse a series of individual branchings in a carbon chain. For example,

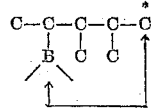

(3) The boron will traverse a remote branching in a carbon chain. The following is illustrative:

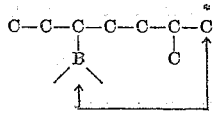

(4) The foregoing traversals will occur beyond a wide variety of branching groups as, for example,

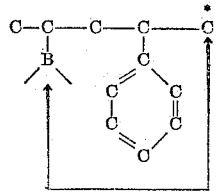

(5) The foregoing traversals permits the boron to become attached to various carbon atoms beyond the branch or branches. For example, both of the traversals depicted below will occur.

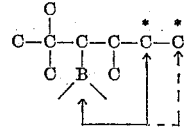

(6) With, for example, appropriate di-aliphatic boranes and tetra-aliphatic diboranes, the foregoing conversions occur concurrently as regards each of the two aliphatic groups attached to the boron atom(s).

(7) With, for example, appropirate tri-aliphatic boranes, the foregoing conversions occur concurrently as regards each of the three aliphatic groups attached to the boron atom.

That the foregoing conversions can be caused to proceed is not only new to the art but quite unexpected. In all previously reported olefin hydrocarbon reactions, the boron atom has been shown to add to the olefin contrary to the Markownikoff rule. In other words the boron attaches to the least-substituted carbon atom. This is referred to as anti-Markownikoff addition. If it be assumed that the foregoing conversions proceed by rupture of the original carbon to boron linkage with the consequent transient formation of an olefin and a boron hydride which then recombine in progressive steps down the chain toward the branch, it is seen that when the boron radical reaches the tertiary carbon atom (i.e. the carbon carrying the branch) the boron hydride must add via the Markownikoff rule. In short, in effecting the foregoing traversal it is reasonable to assume that on passing the intermediate branch or branches the boron hydride is adding to the carbon atom(s) carrying the branch in a manner diametrically opposed to its conventional mode of addition.

Stating it another way, organoboron isomerizations normally proceed from more highly substituted carbon atoms to less highly substituted carbon atoms (i.e. tertiary to primary; secondary to primary). But here, the boron radical departs from its customary role at some stage of the progressive realignment and proceeds from a less highly substituted carbon atom to a more highly substituted carbon atom, the latter being a tertiary carbon atom.

Thus, an especially preferred embodiment of this invention is a process for the conversion of an organoboron compound into at least one isomer thereof; the organoboron compound being characterized by having one carbon atom of a chain of saturated carbon atoms directly bonded to boron and by having the formula

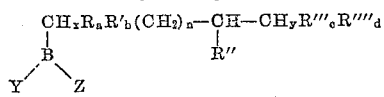

wherein each of R, R', R", R''', R'''' is selected from the group consisting of alkyl, cycloalkyl, aralkyl, aryl, and alkaryl radicals; each of Y and Z is selected from the group consisting of alkyl, cycloalkyl, aralkyl, aryl, alkaryl, alkoxy, cycloalkoxy, aralkoxy, aryloxy, alkaryloxy, hydroxyl, hydrogen, halide radicals, and taken together, are an oxygen atom; $n$ is an integer from 0 to about 10; $x$ is an integer from 0 to 2; $y$ is an integer from 1 to 3; $a$, $b$, $c$, and $d$ are integers such that the sum of $a+b+x$ is equal to 2 and the sum of $c+d+y$ is equal to 3; said isomer being characterized by having a different carbon atom of said chain directly bonded to boron, the first-named carbon atom and the second-named carbon atom being separated from each other in said chain by at least one other carbon atom carrying one hydrogen atom and one R" radicals; which process comprises heating said organoboron compound to a temperature in the range of about 50 to about 300° C. sufficient to effect such conversion.

The organoboron compounds to which this embodiment is applicable include mono-hydrocarbyl boron dihydrides ($RBH_2$; R=hydrocarbyl); dihydrocarbyl diboron tetrahydrides ($R_2B_2H_4$); dihydrocarbyl boron mono-hydrides ($R_2BH$); tetrahydrocarbyl diboron dihydrides ($R_4B_2H_2$); trihydrocarbyl borons ($R_3B$); mono-hydrocarbyl boron dihalides ($RBX_2$; X=halogen); dihydrocarbyl boron mono-halides ($R_2BX$); hydrocarbyl boronates ($RB(OR)_2$);

hydrocarbyl borinates ($R_2B(OR)$); and hydrocarbyl boroxines ($[RBO]_3$). The last-named compounds subsist when Y and Z of the formula in the preceding paragraph when taken together are an oxygen atom. Such compounds normally exist in a trimeric form where the three boron atoms and the three oxygen atoms alternate with each other in the formation of a six-membered ring. Each such boron atom carries one hydrocarbyl radical. In all of the foregoing compounds the hydrocarbyl radical(s) have the formula

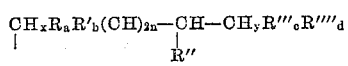

where R, R', R", R''', R'''', $x$, $a$, $b$, $n$, $y$, $c$, $d$ are as defined in the preceding paragraph. Therefore, each of the compounds to which this embodiment of the invention is applicable is characterized by containing at least one hydrocarbyl radical having at least one R" branching substituent on a chain of saturated carbon atoms.

Of the foregoing compounds, best results are achieved by the use of trialkylboranes in which each of the alkyl groups has at least one branch. These preferred trialkylboranes thus have the formula

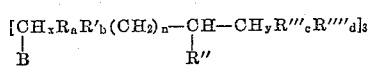

in which R, R', R", R''', R'''', $x$, $a$, $b$, $n$, $y$, $c$, $d$, are as defined above. Of these preferred trialkylboranes, those in which all of the alkyl groups contain the same number of carbon atoms are most especially preferred because the isomers derived therefrom possess a more uniform chemical structure.

This especially preferred facet of this invention involving traversal of branching in a saturated carbon chain is best conducted in the presence of a catalyst, especially a polyether. Notable among such catalysts are the dialkyl ethers of dialkylene glycols, among which the dimethyl, diethyl, and methyl ethyl ethers of diethylene glycol are particularly well suited.

As brought out above, this facet of the invention involving traversal of a branching in a saturated carbon chain is carried out at a temperature ranging from about 50 to about 300° C. sufficient to effect conversion into an isomeric compound where the boron has traversed at least one such bridge. In most cases, it is preferable to conduct this reaction in the range of about 100 to 200° C. It will be understood that the precise temperature and time used in effecting such conversions is in part determined by the nature of the initial organoboron compound, by the nature of the conversion desired, and by other factors such as whether or not a catalyst such as a dialkyl ether of a dialkylene ether is used. Therefore, in conducting this embodiment of the present invention, it is desirable to conduct a few simple pilot experiments to determine the most ideal conditions for the particular conversion in question. Once these pilot experiments have been completed, repeated large scale runs can be very easily effected to give the desired conversions. Generally speaking, the organoboron compounds subjected to this facet of the invention are heated to the foregoing temperatures for periods ranging from about a few minutes to about 24 hours.

By the above facet of this invention, one can achieve excellent utilization of olefinic hydrocarbons in the formation of the ultimate boron isomers. Thus, another embodiment of this invention comprises the reaction of diborane with a branched olefin, (i.e. an olefin containing at least one R" group substituted on a straight chain of the olefin) to produce an organoboron compound having the formula

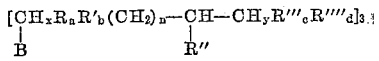

in which R, R', R", R''', R'''', $x$, $a$, $b$, $n$, $y$, $c$, $d$, are as defined above and then heating the reaction mixture so obtained to a temperature in the range of about 50 to about 300° C. sufficient to effect conversion of such boron compounds into an isomer thereof where the boron becomes attached to a carbon atom on the other side of the R″ group. In this manner abundant, low cost, branched olefin hydrocarbons are converted on reaction with diborane into conventional organoboron compounds (the hydroboration reaction occurring in the conventional anti-Markownikoff manner) and these are then converted, without need for isolation or further treatment, into the organoboron isomers which in most cases are very rare. In every case, the conversion process of this embodiment of the invention enables the boron atom to traverse at least one hydrocarbon substituent on a straight chain of carbon atoms.

Another very significant feature of this invention is the discovery that primary organoboron compounds can be converted into isomeric primary organoboron compounds. Never before has such an isomerization been considered feasible. According to this discovery a boron atom attached to a primary carbon atom traverses one or more branching groups and is repositioned on the other primary carbon atom at the other end of the chain. This can be illustrated as follows:

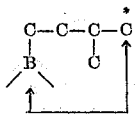

Thus, in effecting this conversion from primary to isomeric primary organoboron compounds a traversal consistent with the foregoing discussion is effected.

The conversion temperatures, conversion times, catalytic systems and the like used in effecting this primary to primary organoboron compound conversion are generally similar to those described above in connection with the traversal-type of conversion.

An important feature of this primary to primary organoboron compound isomerization is that terminal olefins (i.e. 1-olefins) having at least one branch down the chain can be utilized in forming the organoboron compound for subsequent conversion into the other primary isomeric form. For example, diborane can be reacted with 2-methylbutene-1 to form tri-(2-methylbutyl) borane which, without isolation or other treatment, can be subjected to temperatures in the range of about 50 to about 300° C. sufficient to effect conversion into isomeric forms, a major portion of which is tri-(3-methylbutyl)borane. Thus, another highly desirable and useful embodiment of this invention is to react diborane with a branched chain alpha olefin (i.e. an olefin in which the double bond is between the first and the second carbon atoms) to form a primary trialkylborane which is then converted into an isomeric primary trialkylborane by heating the reaction mixture to a temperature in the range of about 50° to about 300° C. (preferably about 100 to about 200° C.) sufficient to effect such conversion.

Still another technical advance provided by this invention is the discovery that organoboron compounds can be converted into isomeric organoboron compounds under controlled conditions to lead to good yields of a variety of particular isomeric forms. For example, secondary organoboron compounds can, under the proper conditions, be converted at least in part to isomeric secondary organoboron compounds. By way of illustration, the following conversions have now been made possible:

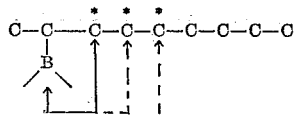

(Controlled conversion: secondary to isomeric secondary)

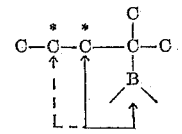

(Controlled conversion: secondary to isomeric secondary involving traversal of branching in a carbon chain)

By the same token, tertiary organoboron compounds can be converted, under controlled conditions, at least in part to secondary isomeric forms. For example

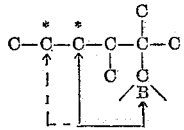

(Controlled conversion: tertiary to isomeric secondary)

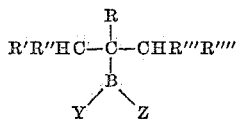

(Controlled conversion: tertiary to isomeric secondary involving traversal of branching in a carbon chain)

Similarly, secondary organoboron compounds can be converted into isomeric tertiary organoboron compounds.

Thus, another significant embodiment of this invention is a process for the conversion of an organoboron compound into at least one isomer thereof; the organoboron compound being characterized by having one carbon atom of a chain of saturated carbon atoms directly bonded to boron and by having the formula $$R'R''HC-\underset{\underset{Y \diagdown Z}{B}}{\overset{R}{C}}-CHR'''R''''$$

wherein R, R', R″, R‴, and R″″ are selected from the group consisting of hydrogen, alkyl, cycloalkyl, aralkyl, aryl, and alkoxy radicals, at least one of R', R″, R‴, and R″″ being other than hydrogen; and each of Y and Z is selected from the group consisting of hydrogen, alkyl, cycloalkyl, aralkyl, aryl, alkaryl, alkoxy, cycloalkoxy, aralkoxy, aryloxy, alkaryloxy, hydroxyl, halide radicals, and taken together, are an oxygen atom; said isomer being characterized by having a different carbon atom of said chain directly bonded to boron, said last-named carbon atom being an internal carbon atom in said chain; which process comprises heating said organoboron compound to a temperature of up to about 250° C., (preferably from about 50 to about 150° C.) sufficient to effect such conversion.

By this process the movement of the boron atom with respect to the chain of saturated carbon atoms is controlled primarily by the temperature conditions but also by the time that the initial organoboron compound is maintained at the given temperature. Generally speaking, times in the range of about a few seconds or less to about 24 hours are sufficient to effect this controlled isomerization. Ordinarily, the higher the temperature, the shorter should be the time. In carrying out this embodiment of the present invention, it is desirable to use a catalyst, especially a dialkyl ether of a dialkylene glycol.

An especially desirable embodiment of this invention is to conduct the foregoing controlled isomerization in the presence of an isomerization regulator. It has been discovered that the specificity of this controlled isomerization process becomes even greater when the process is carried out in the presence of an olefinic compound. Any olefin, especially olefinic hydrocarbons, exerts a regulating effect upon this controlled isomerization so that the make-up of the final isomerized product contains a higher proportion of given isomeric forms. For example, when a tri-secondary alkyl borane or a tri-tertiary alkyl borane is subjected to the above process in the absence of an olefin, the isomerization can be controlled such that a series of isomeric secondary and tertiary alkyl boranes is formed. However, individual isomers among this mixture of end products can be caused to predominate by carrying out this process in the presence of free olefins. For best results, the olefinic hydrocarbon should contain the same number of carbon atoms as the hydrocarbon groups attached to the boron atom.

When using olefins as isomerization regulators in this embodiment of the invention, varying proportions can be employed. Thus, even as little as a trace amount of olefin will exert a profound isomerization regulating effect. Generally speaking, best results are achieved when there is from about 0.01 to about 10 weight percent of olefin based upon the organoborane being subjected to controlled isomerization.

An elegant aspect of this controlled isomerization feature of the present invention is to react diborane with an olefin to form a trialkylborane which is then isomerized by heating the same to a temperature up to about 250° C. sufficient to effect such controlled conversion. In this aspect, the reaction between the olefin and diborane is conducted at very low temperature (e.g. in the range of about −40 to about 25° C.) and then the temperature raised sufficient to effect the desired isomeric conversion. In conducting the first step of this reaction it is very desirable to use an excess of olefin relative to the diborane so that the excess olefin will be available as an isomerization regulator. In the second step, temperatures up to about 150° C. are preferred.

Still another part of this invention relates to the discovery that cycloalkyl secondary boron compounds in which the cycloalkyl group contains one or more alkyl side chains on the ring can be converted under appropriate conditions to isomeric compounds in which the boron becomes attached to a carbon atom on the alkyl side chain. In short, the boron moves from the ring to the alkyl ring substituent. An especially surprising feature of this conversion is the fact that it matters not where the alkyl side chains are located on the ring; the boron atom migrates to the extent necessary to reposition itself on a carbon atom of the side chain. By way of illustration, the following conversions can be effected:

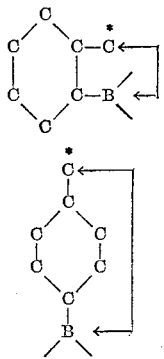

Thus, still another especially preferred embodiment of this invention is a process for the conversion of an organoboron compound into at least one isomer thereof; the organoboron compound being characterized by having one carbon atom of a saturated ring system directly bonded to boron and having at least one alkyl substituent on such ring system; said isomer being characterized by having a carbon atom of said alkyl substituent directly bonded to boron; which process comprises heating said organoboron compound to a temperature in the range of about 100 to about 300° C. sufficient to effect such conversion. Consistent with the previous discoveries, it is desirable to conduct this conversion in the presence of a catalyst, especially a dialkyl ether of dialkylene glycol. Conversion times in the order of about 0.1 to about 40 hours give very satisfactory conversions.

A remarkable feature of this aspect of the present invention is the fact that through this novel isomerization an olefinic double bond can be moved from the ring of a cycloalkene into the side chain of an alkyl substituent of the cycloalkene. For example, upon reacting alpha-pinene with diborane the boron becomes attached to the six-membered ring of the compound. At the same time, of course, the double bond of the ring becomes saturated. Then upon converting the resultant cycloalkyl borane in the manner described above the boron becomes re-positioned upon the methyl substituent on the saturated six-membered ring. When this boron atom is then removed from the cycloalkyl borane by appropriate means, the resultant product is beta-pinene. In other words, by means of this novel isomerization the double bond has been shifted as follows:

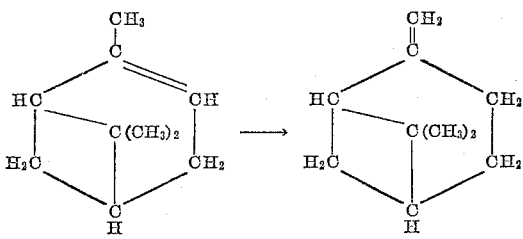

Therefore, another aspect of this invention is to react diborane with a cycloalkene having at least one alkyl substituent on the ring to form an organboron compound in which the boron is bonded to one carbon atom of the resultant saturated ring system and then heating the resultant product to a temperature in the range of about 100° to about 300° C. sufficient to convert the same into an organoboron compound characterized by having a carbon atom of said alkyl substituent directly bonded to the boron.

Other particularly preferred embodiments of this invention comprise the employment of a catalyst for each of the above isomerizations when operating according to the various procedures described above. The catalysts provide faster reaction rates and enhancement in yield and more efficient operation permitting full realization of the numerous and valuable benefits of the invention.

To illustrate the type of materials which may be used as catalysts the following list is offered, but it should be understood that the list is illustrative only and is not to be construed as limiting:

(A) Ethers, e.g. ethyl ether, tetrahydrofuran, diglyme ($CH_3OCH_2CH_2OCH_2CH_2OCH_3$), anisole ($CH_3OC_6H_5$), diisopropyl ether, phenetole.

(B) Organic Esters, e.g. ethyl acetate, ethyl benzoate (C) Inorganic Esters, e.g. trimethyl borate $$(B(OCH_3)_3),$$

triethyl borate, triisopropyl borate, ethyl silicate, trimethyl phosphate, tricresyl phosphate.

(D) Sulfur Derivatives, e.g. ethyl sulfide, methyl ethyl sulfide, diethyl sulfone, tetrahydrothiophene.

(E) Nitro Derivatives, e.g. nitromethane, nitrobenzene.

(F) Amines, e.g. ethylamine, octylamine, dimethylamine, dihexylamine, triethylamine, pyridine, aniline, cyclohexylamine.

(G) Phosphines, e.g. butylphosphine, diethylphosphine, trimethylphosphine, tributylphosphine, phenylphosphine.

As can be seen from the above list, the materials which can be used as catalysts in the present invention are weak donor molecules or weak Lewis bases which are capable of forming unstable complexes or addition compounds with Lewis acids such as diborane and boron fluoride. While any Group VI—A atom could be present in the weakly basic organic compound catalyst, preferably the catalyst will contain oxygen or sulfur.

As a catalyst, the ethers have been found particularly well suited. Included among such ethers are the non-aromatic, aromatic and the polyethers. The non-aromatic ethers include the monoaliphatic and mixed ethers. Typical examples of the monoaliphatic ethers included are di-n-butyl ether; di-sec-butyl ether; diisobutyl ether; di-n-amyl ether; di-n-heptyl ether; tetrahydrofuran; and the like saturated and unsaturated ethers. Examples of the mixed ethers which are employed are n-amylmethyl ether; tert-amylethyl ether; n-butylisopropyl ether; ethylisoamyl ether; n-butyl-n-propyl ether; and the like. The aromatic ethers include, for example, the monoaromatic ethers, alkyl aryl ethers, and the alkaryl alkyl ethers. Typical examples of the monoaromatic ethers include dibenzyl ethers include dibenzyl ether; diphenyl ether; dinaphthyl ether and the like. When the aromatic ether is an alkyl aryl ether, we employ, for example, methyl phenyl ether; methyl-o,m, or p-tolyl ether; methyl-a-naphthyl ether; ethylphenyl ether; ethyl-o,m, or p-tolyl ether; ethyl-a-naphthyl ether; phenyl-n-propyl ether; isopropylphenyl ether; n-butylphenyl ether; n-butyl-otolyl ether; isoamyl-n-naphthyl ether; and the like. The alkaryl alkyl ethers which we employ can be, for example, benzylmethyl ether; benzylethyl ether; benzyl-n-butyl ether; and the like. Examples of the polyethers which are employed are those having the configuration R—O—$(CH_2)_n$—O—R wherein R is an organic radical, preferably hydrocarbon or ether radicals, and $n$ is a small whole number as between about 1 to 10, preferably 1 to 3 inclusive. For example, such polyethers include ethylene glycol ethyl methyl ether; the diethyl ether of ethylene glycol; methyl-n-propyl ether of ethylene glycol; 1,4-dioxane, tetraethylene glycol dimethyl ether; glycerol trimethyl ether; dimethyl ether of diethylene glycol; dimethoxyethane, diethyl ether of diethylene glycol; and the like. Other polyethers which can be employed include, for example, pyrocatechol dimethyl ether; resorcinol dimethyl ether; 1,2,4-trimethoxybenzene, and the like. Typical examples of ethers which are solid but can be employed by virtue of their solubility in particular reaction mixtures include ethers such as didodecyl ether, hexadecyl ether, octadecyleicosyl ether, ditetracosyl ether, o-diethoxy benzene, trimethylene glycol diphenyl ether, 4-methoxy biphenyl and the like.

The foregoing are merely typical examples of the ethers which can be employed in the process of this invention. Because of greater availability and easier handling, the liquid ethers are preferably employed. In this connection, tetrahydrofuran and the polyethers are especially preferred. Of such polyethers, the dimethyl and diethyl ether of diethylene glycol, tetrahydrofuran, and methylethyl ether of diethylene glycol are particularly preferred. It is to be understood that mixtures of the various ethers discussed previously can be employed, for example, a mixture of the diethyl ether and the dimethyl ether of diethylene glycol. Likewise, it has been found that economies can be effected while still obtaining the benefits of the ethers by their employment in admixture with other solvents or suspending media, for example, the hydrocarbons which are particularly preferred. Typical examples of such hydrocarbons are the liquid hydrocarbons such as the nonanes, octadecanes, hexanes, toluene, benzene, xylene, and mixed hydrocarbons such as gasoline, diesel oil and the like petroleum fractions.

The catalytic effect is obtainable when the aforementioned catalysts are employed in minor amount as about 0.01 part per part by weight of the organoboron compound and equally as well when the ether is present in excessive amounts or solvent quantities as about 100 parts per part by weight of the organoboron compound. In a particularly preferred embodiment the catalyst is employed in amount between about 1 to 10 parts per part by weight of the organoboron compound.

The process of this invention involving converting secondary or tertiary organoboron compounds into primary organoboron compounds is further demonstrated by the following examples wherein all parts are by weight unless otherwise specified.

*Example I*

To a reactor equipped with internal agitation, external heating means and a reflux condenser is added 100 parts of 2-pentene and then the theoretical quantity of diborane is fed to the mixture and reacted for 4 hours. A yield of tri-sec-pentylboron in the 80 percent range is obtained. Treating this material with hydrogen peroxide and base results in the formation of a mixture of 2-pentanol and 3-pentanol in the proportion of 2 to 1 respectively.

Repeating the above experiment with the exception that the crude reaction product was not distilled under reduced pressure but heated at 180° C. for 2 hours then cooled and oxidized as above, there is obtained 1-pentanol in a yield in the 90 percent range.

*Example II*

To the reactor of Example I is added 100 parts of tri-sec-hexylboron and the reactor heated to 180° C. for 6 hours. Tri-n-hexylboron is obtained in high yield.

*Example III*

Into the reactor of Example I is added 0.3 mole of 2-hexene in 95 parts of the dimethyl ether of diethylene glycol. This mixture was then reacted with 0.6 mole of diborane at room temperature. At the completion of the reaction the mixture was then heated and refluxed for 4 hours. The reaction mixture was then cooled and oxidized as described in Example II whereby 25.2 parts representing a 82 percent yield of 1-hexanol was obtained demonstrating that the tri-sec-hexylboron product produced was converted to tri-n-hexylboron prior to conversion to the alcohol.

The following example will particularly demonstrate the catalytic effect obtained by an embodiment of this invention wherein an ether is employed as a catalyst.

*Example IV*

Mixed decenes containing 2, 3 4 and 5 decenes, 42 parts, in 85 parts of tetrahydrofuran were treated with 60 millimoles of diborane at room temperature for 2 hours. An 88 percent conversion to the corresponding secondary organoboron compound is obtained as illustrated by a duplication of this procedure and conversion to the alcohols by the procedures in the above examples. At the end of the 2 hour reaction period the tetrahydrofuran was removed by distillation and the mixture was split into three parts which were treated as follows: one portion was refluxed for 4 hours at 220 to 230° C., a second portion was treated by reflux in the dimethyl ether of diethylene glycol for 4 hours at 160 to 165° C. and the third portion by heating in p-cymene solution at 170° C. for 4 hours. After each treatment the reaction mixture was further reacted to convert to the corresponding alcohols. The first procedure resulted in 27.7 parts of total alcohols, 21.1 parts (about 50 percent yield) of which was 1-decanol. The second procedure resulted in 42.2 parts of alcohols of which 37.8 parts, or a 90 percent yield, was 1-decanol and the third procedure gave a 60 percent yield of 1-decanol.

*Example V*

The procedure of Example IV was followed with the exception that 0.3 mole of mixed tetradecenes having a boiling point of 135 to 136° C. at 15 millimeters of mercury was treated with diborane in tetrahydrofuran solution. Then 95 parts of the dimethyl ether of diethylene glycol was added and the tetrahydrofuran removed by distillation. After refluxing the resulting mixture for 16 hours and subsequent conversion to the alcohol a 70 percent yield of 1-tetradecanol was obtained.

Example VI

Employing the procedure of Example II, 100 parts of tri-sec-pentylboron in 100 parts of diamyl ether are heated at 150° C. and autogenous pressure for 3 hours. Tri-n-pentyl boron is obtained in high yield.

Example VII

Tri(6-phenyl-3-hexyl) boron is heated in the methyl ethyl ether of diethylene glycol at 175° C. for 3 hours. Essentially all of the tri(6-phenyl-3-hexyl) boron is converted to tri(6-phenyl-n-hexyl) boron.

Example VIII

When Example III is repeated substituting pyridine, ethyl acetate, trimethyl borate, trimethyl amine or nitro benzene for the dimethyl ether of diethylene glycol, a greater conversion of the tri-sec-hexyl boron to tri-n-hexyl boron is obtained than when no catalyst is employed.

The above examples are presented by way of illustration and it is not intended that the process of this invention be limited thereto. Substitution of any of the secondary or tertiary organoboron compounds hereinbefore mentioned in the above examples will produce similar results. Likewise, the employment of other ethers and catalysts will be evident.

The facet of this invention involving traversal of branching in a carbon chain is further demonstrated by the following examples wherein all parts are by weight unless otherwise specified.

Example IX

Into a reactor employed in Example I was added 0.3 mole of 2,4,4-trimethyl-2-pentene along with 95 parts of the dimethyl ether of diethylene glycol. Diborane was introduced subsequent to nitrogen flushing over a period of 3 hours at room temperature. The reaction mixture was heated for 2 hours under reflux conditions in the ether solution. Oxidation and hydrolysis of the reaction mixture employing 40 parts of 30 percent aqueous hydrogen peroxide and 40 parts of 3 molar aqueous sodium hydroxide resulted in an 80 percent yield of 2,4,4-trimethyl-1-pentanol.

Example X 2-methyl-2-butene (7 parts, 0.1 mole) was dissolved in 45 parts by volume of a 1 molar solution of sodium borohydride in the dimethyl ether of diethylene glycol. To this mixture was added 7.5 parts by volume of boron trifluoride-etherate at 0° C. over a period of 30 minutes. the reaction mixture was allowed to stand an additional hour at room temperature (25° C.). Then the organoborane compound was oxidized with 10.5 parts by volume of a 30 percent aqueous solution of hydrogen peroxide while keeping the pH of the reaction mixture at 8–10 with caustic. The alcohols so formed were extracted with ether and then analyzed by gas chromatography. Formed were 98 percent of 3-methyl-2-butanol and 2 percent of 2-methyl-2-butanol showing that 98 percent of the organoborane formed in this run had been tri-(1,2-dimethylpropyl)borane. By the same token, only 2 percent of the organoborane had been tri-(1,1-dimethylpropyl)borane.

The above procedure was then repeated in exactly the same fashion except that prior to the oxidation step, the organoborane reaction mixture was heated to 100° C. for 120 minutes. As a result of this conversion, only 29 percent of tri-(1,2-dimethylpropyl)borane remained and 21 percent of tri-(2-methylbutyl)borane had been formed.

Example XI

A mixture of 98 percent of tri-(1,2-dimethylpropyl)-borane and 2 percent of tri-(1,1-dimethylpropyl)borane was heated in the dimethyl ether of diethylene glycol to 100° C. for 240 minutes. Upon oxidation as in Example X, it was found that 30 percent of tri-(2-methylbutyl)-borane had been formed and that only 14 percent of the tri-(1,2-dimethylpropyl)borane remained.

Example XII

The procedure of Example X was repeated except that the mixture of 98 percent of tri-(1,2-dimethylpropyl)-borane and 2 percent of tri-(1,1-dimethylpropyl)borane was heated for 120 minutes at 120° C. In this instance, 39 percent of tri-(2-methylbutyl)borane had been formed and no tri-(1,2-dimethylpropyl)borane remained.

Example XIII

Dissolved in 40 parts by volume of sodium borohydride dissolved in the dimethyl ether of diethylene glycol as a 1 molar solution was 11.2 parts (0.1 mole) of 2,4,4-trimethylpentene-2. Then, boron trifluoride-etherate was added to the reaction mixture at 20° C. over a period of 30 minutes. The reaction mixture was then left an additional hour at room temperature and then oxidized as described in Example X.

The procedure was then repeated several additional times except that prior to oxidation the organoborane reaction mixture was heated to 75° C. for varying periods of time. The results of these experiments are tabulated below.

| Conversion temp., ° C | Conversion time, minutes | Alcohol, weight percent | |
| --- | --- | --- | --- |
| | | 2,4,4-trimethyl-pentanol-3 | 2,4,4-trimethyl-pentanol-1 |
| 25 [1] | 0 | 93 | nil |
| 75 | 60 | 22 | 51 |
| 75 | 120 | 8 | 78 |
| 75 | 180 | 4 | 88 |
| 75 | 240 | trace | 90+ |

[1] Organoborane reaction mixture was not converted.

The above results show that under the conversion conditions a substantial proportion of the trialkylborane

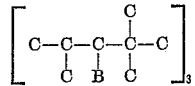

had been converted prior to oxidation to the isomeric trialkylborane

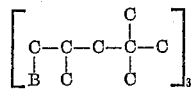

and that this conversion involved traversal of the methyl branching.

Example XIV 10 parts of tetra-(1-phenyl-2,3-dimethylbutyl)diborane in 10 parts of the dimethyl ether of diethylene glycol is heated 4 hours at 160° C. The resultant product is then oxidized according to the procedure described in Example X using aqueous alkaline hydrogen peroxide. Analysis of the resultant product shows the presence of 2,3-dimethyl-4-phenylbutanol-1. Hence, during the conversion the boron is caused to traverse two methyl branches.

Example XV

Using 10 parts of the dimethyl ether of diethylene glycol as conversion medium, 10 parts of diethyl-1-phenyl-2,3-dimethylbutyl boronate is heated to 160° C. for 4 hours. Oxidation with alkaline aqueous hydrogen peroxide solution leads to the formation of 2,3-dimethyl-4-phenylbutanol-1 showing that the boron had migrated past two branches and become affixed to the terminal position during the conversion step.

The process of this invention involving converted organoboron compounds into isomeric primary organoboron compounds is further demonstrated by the following examples wherein all parts are by weight unless otherwise specified.

Example XVI

A sample of tri-(2-methyl-1-pentyl)borane (prepared by hydroboration of 2-methyl-1-pentene) was oxidized with hydrogen peroxide and sodium hydroxide to the corresponding alcohols, which was shown to be essentially 100 percent 2-methyl-1-pentanol by vapor phase chromatography. A second sample of the same borane was dissolved in diethyl ether of diethylene glycol and heated for 17 hours at 170 to 175° C. Oxidation and analysis in the same manner described above led to a mixture containing 49.8 percent 2-methyl-1-pentanol and 48.6 percent 4-methyl-1-pentanol.

Example XVII

A sample of tri-(2-methyl-1-butyl)borane was oxidized with hydrogen peroxide and sodium hydroxide to the corresponding alcohol, which was shown to be essentially 100 percent 2-methyl-1-butanol by vapor phase chromatography. A second sample of the same borane was dissolved in the diethyl ether of diethylene glycol and heated at 155 to 175° C. for 111.5 hours. Oxidation and analysis in the same manner described above led to a mixture containing 50.2 percent 2-methyl-1-butanol, 49.8 percent 3-methyl-1-butanol, and a trace of 3-methyl-2-butanol.

Example XVIII

To a reactor equipped with internal agitation, external heating means and a reflux condenser is added 15 parts of 2,3-dimethylpentene-1 in 10 parts of the dimethyl ether of diethylene glycol and then the theoretical quantity of diborane is fed to the mixture and reacted for 1 hour. The mixture is heated at 150° C. for 6 hours and then oxidized and hydrolyzed as in Example X to give a high yield of alcohols containing 3,4-dimethylpentanol-1 and a lesser amount of 2,3-dimethylpentanol-1 showing boron migration past two branches from one end of the carbon chain to the other.

The process of this invention involving controlled conversions of secondary or tertiary organoboron compounds into isomeric secondary or tertiary organoboron compounds is futher demonstrated by the following specific examples wherein all parts are by weight unless otherwise specified.

Example XIX

Tri-(3-hexyl)borane (prepared by reacting diborane with hexene-3 at 20 to 25° C. for 30 minutes using the dimethyl ether of diethylene glycol as reaction solvent and catalyst) was oxidized as described in Example X. The resultant alcohol was 100 percent 3-hexanol. Another portion of tri-(3-hexyl)borane in the dimethyl ether of diethylene glycol was heated for 60 minutes at 120° C.; then, the resultant organoborane subjected to the same oxidation procedure. The reaction mixture contained 41 percent 2-hexanol, 27 percent 1-hexanol, and 32 percent 3-hexanol. This shows that the tri-(3-hexyl)borane was converted in large measure to tri-(2-hexyl)borane prior to the oxidation. Consequently, this example demonstrates the controlled isomerization of a secondary organoborane compound into an isomeric secondary organoborane compound.

Example XX

Dissolved in 40 parts by volume of sodium borohydride dissolved in the dimethyl ether of diethylene glycol as a 1 molar solution was 11.2 parts (0.1 mole) of 2,4,4-trimethylpentene-2. Then, boron trifluoride-etherate was added to the reaction mixture at 20° C. over a period of 30 minutes. The reaction mixture was then left an additional hour at room temperature and then oxidized as described in Example X.

The procedure was then repeated except that prior to oxidation, the organoborane product was heated to 75° C. for 60 minutes. The results of these experiments are tabulated below.

| Conversion temp., °C | Conversion time, minutes | Alcohol, weight percent | |
|---|---|---|---|
| | | 2,4,4-trimethyl-pentanol-3 | 2,4,4-trimethyl-pentanol-1 |
| 25 [1] | 10 | 93 | 7 |
| 75 | 60 | 22 | 27 |

[1] Organoborane reaction mixture was not converted.

The above results show that under the conversion conditions a substantial proportion of the trialkylborane

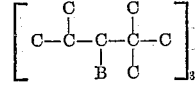

had been converted prior to oxidation to the isomeric trialkylborane

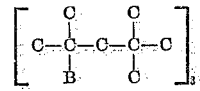

and that this conversion involved traversal of the methyl branching. Thus, this example demonstrates the controlled isomerization of a secondary organoboron compound into a tertiary organoboron compound.

Example XXI 10 parts of di-(3-cyclohexyl-3-pentyl)diborane is heated to 100° C. for 1.5 hours. The product is then oxidized with alkaline aqueous hydrogen peroxide solution. The resultant product is found to contain a significant amount of 3-cyclohexylpentanol-2. Accordingly, this experiment demonstrates the controlled isomerization of a tertiary organoboron compound into a secondary organoboron compound.

The following examples illustrates that embodiment of this invention involving the use of an olefin as an isomerization regulator.

Example XXII 2-hexene (8.4 parts, 0.1 mole) was added to a solution of sodium borohydride (28 parts by volume, 1 molar solution) in the dimethyl ether of diethylene glycol. Boron trifluoride-etherate (4.7 parts by volume) was added to the resultant solution at 20° C. over a period of 30 minutes. The organoborane product was oxidized with 10.5 parts by volume of a 30 percent aqueous solution of hydrogen peroxide while keeping the pH of the reaction mixture at 8–10 with caustic. The alcohol was extracted with ether and analyzed by gas chromatography. It was found that 50 percent of the alcohol product was 2-hexanol and 50 percent was 3-hexanol.

The above procedure was then repeated in exactly the same manner except that prior to the oxidation step the organoborane reaction mixture was heated to 120° C. for 180 minutes. As a result of this conversion in the absence of olefin, the alcohol product was made up of 60 percent 1-hexanol, 28 percent 2-hexanol and 12 percent 3-hexanol. Thus, this reaction showed that under these conversion conditions in the absence of an olefin the predominant conversions progressed from tri-(3-hexyl)borane and tri-(2-hexyl)borane to tri-(n-hexyl)borane.

In this next experiment, a deficient amount of diborane was used for the hydroboration of 2-hexene. In other words, excess 2-hexene was present during the conversion step. In particular, 2-hexene (8.4 parts, 0.1 mole) was added to a solution of sodium borohydride (25 millimoles) in the dimethyl ether of diethylene glycol. To this solution was added boron trifluoride-etherate so as to generate the deficient amount of diborane. The reaction mixture was then heated for 180 minutes at 120° C. After oxidation and hydrolysis, the following isomer distribution was obtained: 78 percent of 2-hexanol, 22 percent of 3-hexanol, and only a trace of 1-hexanol. Hence, the presence of the olefin during the conversion step regulated the isomerization so that essentially no tri-(n-hexyl)borane was formed and such that the chief extent of isomerization involved conversion of tri-(3-hexyl)borane to tri-(2-hexyl)borane.

*Example XXIII*

11.2 parts (0.1 mole) of 2-octene is dissolved in 40 parts by volume of a 1 molar solution of sodium borohydride dissolved in the dimethyl ether of diethylene glycol. Then, boron trifluoride-etherate is added to the reaction mixture at 20° C. over a period of 30 minutes. Next 2.2 parts (0.02 mole) of 2-octene is added to the mixture which is then heated 2 hours at 130° C. After oxidation and hydrolysis, only a trace of 1-octanol is present. The major component is 2-octanol with a smaller amount of 3-octanol.

The following examples illustrate that embodiment of this invention involving converting organoboranes in which the boron atom is attached to a saturated ring system carrying at least one alkyl substituent into isomers thereof in which the boron atom becomes attached to a carbon atom of such alkyl substituent.

*Example XXIV*

Dissolved in 40 parts by volume of a 1 molar solution of sodium borohydride in the dimethyl ether of diethylene glycol is 9.6 parts (0.1 mole) of methyl cyclohexene. Then boron trifluoride-etherate is added to the reaction mixture at 20° C. The reaction mixture is heated for 5 hours at 150° C. and then oxidized as described in Example X. Chemical analysis shows that hydroxymethyl cyclohexane (i.e. cyclohexyl carbinol) has been produced.

*Example XXV*

A solution of 10 parts tetra(3-ethylcyclopentyl)diborane in 10 parts of the dimethyl ether of diethylene glycol is heated to 160° for 4 hours, then oxidized as in Example X. Analysis of the resultant product shows that 2-cyclopentylethanol has been formed.

Some of the above examples demonstrate particular embodiments of this invention wherein diborane is reacted with an olefin to produce an appropriate organoborane compound for conversion pursuant to the various embodiments of this invention. Thus, Examples I, III, IV, V, and VIII illustrate that embodiment wherein diborane is reacted with an internal olefin and the product so produced is isomerized to produce straight chain or primary organoborane compounds. Similarly, Examples IX, X, XII, and XIII illustrate that embodiment wherein diborane is reacted with an appropriate branched olefin and the product so produced is isomerized so as to cause the boron to traverse at least one branching in a carbon chain. Likewise, Example XVIII illustrates that embodiment wherein diborane is reacted with a branched alpha olefin to form a primary organoborane which is then converted to produce the isomeric primary organoborane. By the same token, Examples XX and XXII illustrate that embodiment wherein diborane is reacted with an internal olefin and the product so produced is subjected to controlled isomerization to produce isomeric organoboron compounds wherein at least a portion of the borons become attached to the other internal carbon atoms. Moreover, Example XXIV illustrates that embodiment wherein diborane is reacted wtih a cycloalkadiene having at least one alkyl substituent on the ring and the product so produced is isomerized to produce organoborane compounds in which the boron is attached to a carbon atom of the alkyl substituent. In general, the first step of each of the foregoing processes, that is, the reaction of diborane with the appropriate olefin, is accomplished by bringing these materials into contact at temperatures between about 0 to 100° C. In this step also, a particularly preferred embodiment comprises conducting this reaction in the presence of the aforementioned catalysts, especially the polyethers since such catalyze this operation. Thus, both the first and second steps can be conducted in the same catalytic system with only an increase in temperature after the completion of the reaction of the internal olefin with the diborane. An in situ isomerization can be accomplished by conducting the addition of the diborane with the olefin at 0 to 100° C. and then increasing the temperature of the reaction mixture to 150° C. because undesirable side reactions take place, for example, polymerization of the olefin.

Although the above examples demonstrate the use of solvents, particularly the catalytic ether solvents, it is to be recognized that other solvents can be employed if desired. Included among such other solvents are the hydrocarbons and tertiary amines. Typical examples of such solvents include the hexanes, octanes, nonanes, octadecanes, cyclohexanes, benzene, toluene, xylene and the like hydrocarbons which are essentially inert to the reactants and products. Among the tertiary amines which can be employed, either as solvents or catalysts, are included the tertiary, alkyl, aryl and cyclic amines. Typical examples of such amines include methylpyridine, amyl diphenyl amine, p-isobutyl dimethyl aniline, triphenyl amine, tricyclohexyl amine, triethyl amine, trimethyl amine and the like. Such amines result in the formation of a complex with the organoboron compounds. Such complexes are not deleterious since the organoboron compounds can be separated therefrom by heating.

Ordinarily atmospheric pressure is employed in the process of this invention although in those instances wherein the constituents would vaporize under the conditions of treatment generally the autogenous or increased pressure as up to about 50 atmospheres can be employed. On the other hand, atmospheric pressure can be employed with many of the organoboron compounds isomerized simply by using a reflux technique.

The products produced according to the process of this invention are of considerable utility. As demonstrated in the examples, they are readily converted into a wide variety of alcohols by oxidation and hydrolysis. Many such alcohols are especially useful in the preparation of detergents in the soap and detergent industry. The alcohols so-produced can also be employed in a sodium alcohol reduction of fatty acid esters. Many of the alcohols are useful as plasticizers and as chemical intermediates in the synthesis of esters and the like. The organoboron compounds are useful as intermediates for the preparation of other organometallic compounds. For example, reaction with particular lead salts will produce the corresponding lead organometallic compound. A typical example of this use is the reaction of lead acetate with tri-n-propyl boron to produce tetra-n-propyllead which is useful as an antiknock compound. A still further use of the organoboron compounds is as a catalyst in the polymerization of olefins, especially ethylene to produce polyethylene. Still further uses will be evident to those skilled in the art.

This application is a continuation-in-part of copending application Serial No. 738,307 filed May 28, 1958, and now abandoned.

Having thus described the process of this invention, it is not intended that it be limited except as set forth in the following claims.

What is claimed is:

1. A process for preparing an organoboron compound in which the boron of the boron moiety is to be directly linked by one bond to a saturated chain of a hydrocarbon radical having at least five carbon atoms with at least one branch on a chain carbon other than the one to which the boron is desired to be attached, the boron moiety having the boron attached by its remaining bonds to at least one radical selected from the class consisting of hydrogen, alkyl, cycloalkyl, aralkyl, aryl, alkaryl, alkoxy, cycloalkoxy, aralkoxy, aryloxy, alkaryloxy, hydroxyl, halide and oxygen, said process being characterized by the steps of providing an isomeric organoboron compound having the boron-containing moiety bonded to the same hydrocarbon radical at an original carbon different from the desired carbon, the original carbon and the desired carbon being on opposite sides of at least one branch and on the same side of any quaternary carbon, and then heating the provided compound to a temperature from about 50 to about 300° C. for a period of time sufficient to cause the boron linkage with the chain to move from the original carbon atom past the branch to the desired carbon atom.

2. The process of claim 1 in which the heating is carried out with the provided compound in contact with a catalyst.

3. The process of claim 1 wherein the prepared organoboron compound is a trialkylborane.

4. The process of claim 1 wherein the prepared organoboron compound is a trialkylborane in which the alkyl groups contain the same number of carbon atoms.

5. The process of claim 1 wherein the heating is to a temperature from about 100 to about 200° C.

6. The process of claim 1 wherein the original and final carbon atoms are each primary carbon atoms.

7. A process for the preparation of an organoboron compound having the formula

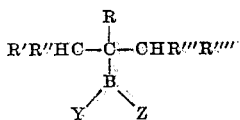

wherein R, R', R'', R''', R'''' are selected from the group consisting of hydrogen, alkyl, cycloalkyl, aralkyl, aryl, and alkoxyl radicals, at least two of R', R'', R''', and R'''' being other than hydrogen; and each of Y and Z is selected from the group consisting of hydrogen, alkyl, cycloalkyl, aralkyl, aryl, alkaryl, alkoxy, cycloalkoxy, aralkoxy, aryloxy, alkaryloxy, hydroxyl, halide radicals, and, taken together, are an oxygen atom; said process being characterized by the steps of providing an organoboron compound isomeric with the one to be prepared by having the boron bonded to a different carbon of the chain in the formula, said last-named carbon being an internal carbon atom in said chain, and heating the provided organoboron compound to a temperature of up to about 250° C. for a time sufficient to cause the boron bond to shift from the original carbon to the desired carbon and convert the provided compound to the desired compound.

8. The process of claim 7 wherein a catalyst for the conversion is employed.

9. The process of claim 7 wherein the prepared organoboron compound is a trialkylborane.

10. The process of claim 7 wherein the prepared organoboron compound is a trialkylborane in which the alkyl groups contain the same number of carbon atoms.

11. The process of claim 7 wherein the heating is to a temperature from about 50 to about 150° C.

12. The process of claim 7 wherein R is hydrocarbon.

13. The process of claim 7 wherein R is a hydrocarbon radical.

14. A process for preparing an organoboron compound having a boron moiety in which the boron is directly linked by one bond to a carbon of an alkyl group that is substituted on a saturated hydrocarbon ring, the boron moiety having the remaining two bonds of the boron bonded to at least one radical selected from the class consisting of hydrogen, alkyl, cycloalkyl, aralkyl, aryl, alkaryl, alkoxy, cycloalkoxy, aralkoxy, aryloxy, alkaryloxy, hydroxyl, halide and oxygen, said process being characterized by the steps of providing an isomeric organoboron compound having the boron-containing moiety directly linked to a carbon in the ring of the same alkyl-substituted saturated ring structure, and then heating the provided compound to a temperature of from about 100 to about 300° C. for a time sufficient to cause the boron-containing moiety to shift its linkage from the saturated ring to the desired carbon.

15. The process of claim 14 in which the heating is carried out with the provided compound in contact with a catalyst.

16. The process of claim 14 wherein the prepared organoboron compound is a hydrocarbon boron compound.

17. The process of claim 14 wherein the organoboron compound that is provided is the reaction product of alpha-pinene and diborane.

18. A process of isomerizing a boron compound into an isomer thereof, said compound being characterized in that
    (a) it is a saturated hydrocarbon boron compound having up to about 30 carbon atoms in each hydrocarbon group,
    (b) it has a boron atom attached to a carbon atom which is internal in a carbon chain, and
    (c) it has at least one primary carbon atom as an integral part of said chain; said isomer being characterized in that said boron atom is attached to said primary carbon atom,
    which process comprises heating said compound in contact with a weak Lewis base catalyst to a temperature between about 100 to about 200° C. and for a period of time sufficient to convert said compound into said isomer.

19. The process of claim 18 wherein said catalyst is the dimethyl ether of diethyleneglycol.

20. The process of claim 18 wherein said catalyst is an ether.

21. The process of claim 18 wherein said catalyst is selected from the group consisting of tetrahydrofuran and polyethers.

22. The process of claim 18 wherein said boron compound is characteried in that
    (a) it is a trialkylborane in which each alkyl group contains up to about 20 carbon atoms,
    (b) the boron atom thereof is attached to an internal carbon atom of each of said alkyl groups, and
    (c) each of said internal carbon atoms is at least the third carbon atom away from the nearest primary carbon atom of the carbon chain making up said alkyl groups.

23. The process of claim 18 wherein said hydrocarbon boron compound terated is a trialkylboron compound.

24. The process of claim 23 wherein said trialkylboron compound is tri-sec-pentyl boron.

25. A process for preparing tri-n-decylboron which comprises heating a mixture of diethyleneglycol dimethyl ether with tri-sec-decylborons in which the decyl groups are straight chains, to a temperature between about 160 and 165° C. for a period sufficient to convert said tri-sec-decylborons to tri-n-decylboron.

26. The process for the preparation of saturated hydrocarbon boron compounds which comprises reacting diborane with an acyclic internal olefin dissolved in a polyether to produce a secondary hydrocarbon boron compound and then converting said secondary hydrocarbon boron compound into a primary hydrocarbon boron compound by heating said secondary hydrocarbon boron compound while dissolved in a polyether to a temperature between about 100 and 200° C. for a period sufficient to convert said secondary hydrocarbon boron compound into said primary hydrocarbon boron compound.

27. A process of isomerizing a boron compound into an isomer thereof, said compound being characterized in that
    (a) it is a trialkylborane in which each alkyl group contains up to about 20 carbon atoms,
    (b) the boron atom thereof is attached to an internal carbon atom of each of said alkyl groups, and (c) each of said internal carbon atoms is at least the third carbon atom away from the nearest primary carbon atom of the carbon chain making up said alkyl groups, said isomer being characterized in that said boron atom is attached to the primary carbon atoms of each of said alkyl groups, which process comprises heating said compound to a temperature between about 100 and about 175° C. for a period of time sufficient to convert said compound into said isomer.

28. The process for the preparation of saturated hydrocarbon boron compounds which comprises reacting diborane with an acylic internal olefin while in contact with a weak Lewis base catalyst to produce a secondary hydrocarbon boron compound and then converting said secondary hydrocarbon boron compound into a primary hydrocarbon boron compound by heating said secondary hydrocarbon boron compound while in contact with a weak Lewis base catalyst to a temperature between about 100 and 200° C. for a period sufficient to convert said secondary hydrocarbon boron compound into said primary hydrocarbon boron compound.

References Cited in the file of this patent

UNITED STATES PATENTS

| | | |
|---|---|---|
| 2,880,243 | Hennion | Mar. 31, 1959 |
| 2,964,567 | Neff | Dec. 13, 1960 |

OTHER REFERENCES

Hennion et al.: (1) Am. Chem. Soc. Abs. of Papers, 130th Meeting 1956, page 53-0.

Hennion et al.: (2) J. Am. Chem. Soc., vol. 79, pp. 5190–1 (Oct. 5, 1957).